United States Patent
Hodjat

(10) Patent No.: US 6,386,065 B1
(45) Date of Patent: May 14, 2002

(54) DUAL RING DAMPER

(75) Inventor: Yahya Hodjat, Oxford, MI (US)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 09/625,373

(22) Filed: Jul. 25, 2000

(51) Int. Cl.⁷ .............................................. F16F 15/10
(52) U.S. Cl. ........................................ 74/574; 474/94
(58) Field of Search ............................. 74/574; 474/94

(56) References Cited

U.S. PATENT DOCUMENTS

| | | | | |
|---|---|---|---|---|
| 3,901,101 A | * | 8/1975 | McGavern | 74/574 |
| 3,945,269 A | | 3/1976 | Bremer, Jr. | 74/574 |
| 4,083,265 A | | 4/1978 | Bremer, Jr. | 74/574 |
| 4,262,553 A | * | 4/1981 | Bremer, Jr. | 74/574 |
| 4,318,309 A | | 3/1982 | Bremer, Jr. | 74/574 |
| 4,378,865 A | | 4/1983 | McLean | 188/379 |
| 4,815,332 A | | 3/1989 | Serizawa et al. | 74/573 |
| 4,881,426 A | | 11/1989 | Serizawa et al. | 74/574 |
| 4,962,677 A | * | 10/1990 | Withers | 74/574 |
| 5,025,681 A | | 6/1991 | Andra | 74/574 |
| 5,139,120 A | | 8/1992 | Gomi | 188/378 |
| 5,231,893 A | | 8/1993 | Sisco et al. | 74/574 |
| 5,445,049 A | * | 8/1995 | Ullrich et al. | 74/574 |
| 5,449,322 A | | 9/1995 | Wagner | 464/90 |
| 5,453,056 A | | 9/1995 | Ullrich et al. | 474/94 |
| 5,460,356 A | * | 10/1995 | Schwibinger | 267/281 |
| 6,062,104 A | * | 5/2000 | Allport | 74/574 |
| 6,106,421 A | * | 8/2000 | Graber et al. | 474/94 |
| 6,136,134 A | * | 10/2000 | Scherdt et al. | 156/294 |
| 6,171,194 B1 | * | 1/2001 | Haga et al. | 464/89 |

FOREIGN PATENT DOCUMENTS

| | | | | |
|---|---|---|---|---|
| JP | 56-80556 | * | 7/1981 | F16H/55/14 |
| JP | 6-300117 | * | 10/1994 | F16H/55/36 |

* cited by examiner

Primary Examiner—David A. Bucci
Assistant Examiner—Vicky A. Johnson
(74) Attorney, Agent, or Firm—J. A. Thurnau, Esq.; C. H. Castleman, Esq.; S. G. Austin, Esq.

(57) ABSTRACT

The invention comprises a dual ring damper. The damper comprises an inner ring for connecting the damper to a crankshaft. It also comprises an outer inertial ring for contacting a belt or the like. A flexible elastomeric material is mechanically contained in an annular space between the inner ring and the outer ring. The inner surface of the outer ring and the outer surface of the inner ring each describe a complex, non-arcuate cooperating, profile or cross-section that mechanically fixes the elastomeric between them. The elastomeric does not use chemical adhesives to bond with either the inner or the outer ring, instead relying on mechanical containment between the rings. The elastomeric in the preferred embodiment comprises EPDM.

6 Claims, 3 Drawing Sheets

DUAL RING DAMPER

FIELD OF THE INVENTION

The invention relates to crankshaft dampers, and more particularly to crankshaft dampers having a dual ring configuration with a mechanically fixed flexible medial elastomeric member for absorbing torsional and bending vibrations.

BACKGROUND OF THE INVENTION

Devices for damping crankshaft vibrations have been known in the art for many years. During operation, a crankshaft on an internal combustion engine rotates in response to the periodic pulses from the cylinders as each fires in turn. This produces vibrations in the crankshaft that are detrimental to the long term life of the engine, as well as connected components.

A particular class of dampers relies on concentric rings connected by a flexible elastomeric member. The inner ring secures the damper to the crankshaft. The outer ring contacts a belt for power transmission. The elastomeric member is contained between the rings, either by adhesives or by mechanical means. The torsional impulses from the crankshaft are diminished or absorbed by the flexible elastomeric member as the crankshaft rotates. The elastomeric generally occupies a constant cross-section annular space between the rings.

Representative of the art is U.S. Pat. No. 5,231,893 (1993) to Sisco et al. which discloses a crankshaft vibration damper having an elastomer member positioned between a hub and an outer inertia member. A radially. outward or inward curvature of the hub and inertia member is selected to reduce crankshaft bending vibration.

Also representative of the art is U.S. Pat. No. 5,453,056 (1995) to Ullrich et al. which discloses a pulley. and a torsional vibration damper connected to the pulley by an axial rim and an elastomeric member.

The prior art dampers rely primarily on adhesives that are not environmentally friendly to connect the rings to the elastomeric element. Failure of the adhesive or the surrounding elastomeric can cause catastrophic failure of the damper and damage to the engine.

What is needed is a dual ring damper that has a mechanical connection to retain the elastomeric between the rings. What is needed is a dual ring damper that has a mechanical connection comprising a complex, non-arcuate cooperating profile. What is needed is a dual ring damper using an EPDM elastomeric as the damping medium. What is needed is a dual ring damper with expanded tuning capabilities and range of frequencies due to the profile and volume of the elastomeric. The present invention meets these needs.

SUMMARY OF THE INVENTION

The primary aspect of the present invention is to a dual ring damper that has a mechanical connection to retain the elastomeric between the rings.

Another aspect of the invention is to provide a dual ring damper that has a mechanical connection comprising a complex, non-arcuate cooperating profile.

Another aspect is to provide a dual ring damper using an EPDM elastomeric as the damping medium.

Another aspect is to provide a dual ring damper with expanded tuning capabilities and range of frequencies due to the profile and volume of the elastomeric.

Other aspects of the invention will be pointed out or made apparent by the following description of the invention and the accompanying drawings.

The invention comprises a dual ring damper. The damper comprises an inner ring for connecting the damper to a crankshaft. It also comprises an outer inertial ring for contacting a belt or the like. A flexible elastomeric material is mechanically contained in an annular space between the inner ring and the outer ring. The inner surface of the outer ring and the outer surface of the inner ring each describe a complex, non-arcuate cooperating profile or cross-section that mechanically fixes the elastomeric between them. The elastomeric does not use chemical adhesives to bond with either the inner or the outer ring, instead relying on the mechanical containment between the rings. The elastomeric in the preferred embodiment comprises EPDM.

DESCRIPTION OF THE PREFERRED EMBODIMENT OF THE INVENTION

Figure 1:
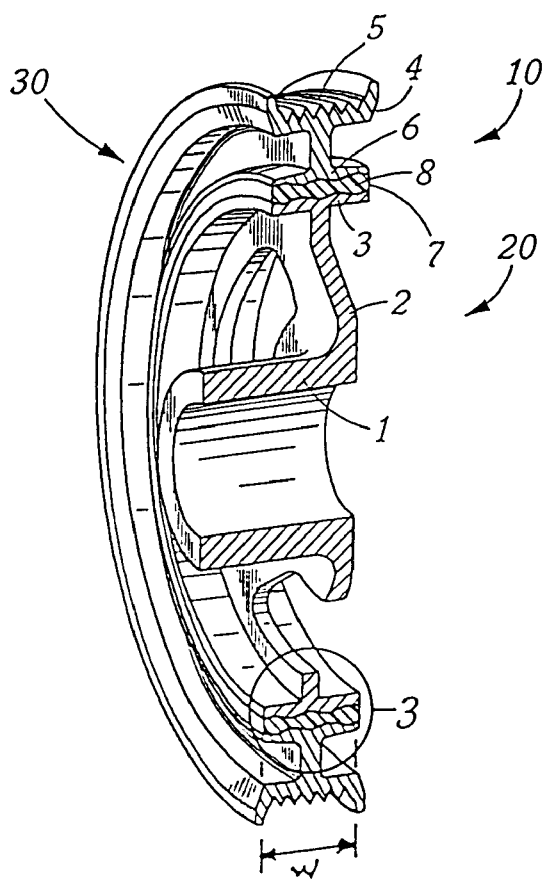
FIG. 1 is a cross-sectional view of the invention.

FIG. 1 depicts a cross-sectional view of the invention. Dual ring damper 10 comprises inner ring 20 and inertial outer ring 30.

Inner ring 20 comprises hub 1 and web 2. Hub 1 is sized to attach to a shaft, such as a crankshaft. The configuration shown in FIG. 1 is for a press fit of hub 1 to a shaft, although a flange or other arrangement known in the art may also be used to secure the hub to a receiving shaft. Inner ring 20 also comprises. web rim 3. Rim 3 extends about the circumference of and is connected to web 2.

Inertial or outer ring 30 comprises outer ring rim 6 and belt receiving portion 4. Belt receiving portion 4 may comprise any belt profile 5 known in the art including that for a multi-ribbed belt shown in the figure.

Rims 3, 6 describe an annular space having a gap G between them. Rims 3, 6 have a width W that extends substantially parallel to a rotational axis of the web and damper.

Rims 3, 6 each have a complex shape that allows elastomeric member 7 to be mechanically captured or fixed in the annular space between rim 3 and 6, thus mechanically holding the inner ring and the inertial ring in proper relative position without the use of chemical adhesives. Elastomeric 7 may comprise any flexible elastomeric material known in the art, including but not limited to EPDM, VAMAC, neoprene, SBR, and rubber.

In the preferred embodiment no adhesives are required to hold the elastomeric 7 between rims 3, 6, since this is accomplished through the mechanical connection. The cross-section or profile of rims 3, 6 describe a series of undulations that extend or cycle in an axial direction along the inner surface 16 of the outer ring rim and along the outer surface 13 of the web rim. In the preferred embodiment, the undulations in each rim 3, 6 are shifted in phase such that a waist or neck 8 is formed at intervals across the axial width of the elastomeric member 7, see FIGS. 3 and 5.

Figure 2:
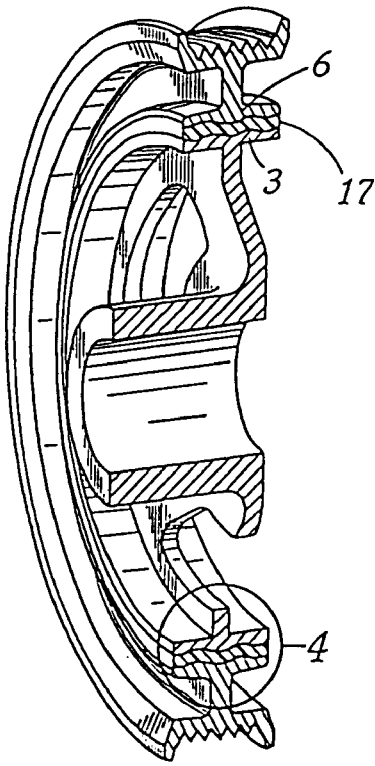
FIG. 2 is a cross-sectional view of an alternate embodiment of the rims.

FIG. 2 is a cross-sectional view of an alternate embodiment of the rims. Rims 3, 6 describe a series of undulations that extend in an axial direction along the inner surface 16 of the outer ring rim and along the outer surface 13 of the web rim. In this embodiment, the undulations between the rims are in phase or synchronized so the spacing between the inner surface of the inertial ring and the outer surface of the inner ring is constant, see FIGS. 4 and 6.

Figure 3A:
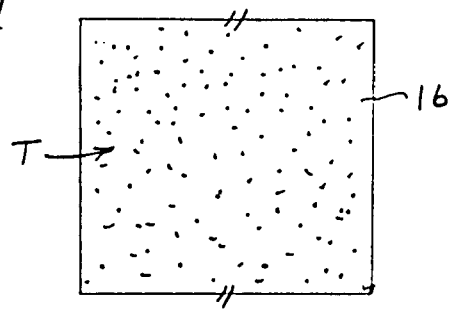
FIG. 3a is a an view of the frictional texture.
Figure 3:
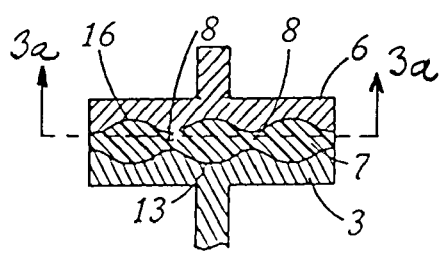
FIG. 3 is a cross-sectional view at detail 3 in FIG. 1.

FIG. 3 is a cross-sectional view at detail 3 in FIG. 1. Waists 8 are formed between opposing undulations in rim surfaces 13, 16. The undulations and waists mechanically grip the elastomeric member between the rims. One can appreciate that the "bubble" shaped profile creates a strong mechanical connection between the rims and the elastomeric member.

In an alternate embodiment, the inner surface 16 and outer surface 13 comprise a texture T for mechanically fixing the elastomeric between the web rim and the inertial rim, see FIG. 3a. The alternate embodiment texture may comprise knobs, surface roughness, or any other form of random surface irregularity or friction producing form.

Further, in an alternate embodiment, grooves or curved surfaces, resembling a cog pulley or sprocket, can be formed in the inner and outer rim surfaces 13, 16 that are perpendicular to the undulations. This would increase the circumfrential rubber-metal attachment strength.

Figure 4:
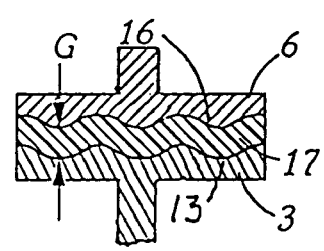
FIG. 4 is a cross-sectional view at detail 4 in FIG. 2.

FIG. 4. is a cross-sectional view at detail 4 in FIG. 2. Annular space gap spacing G and thickness S, see FIG. 6, of elastomeric member 7, is constant between the cooperating undulations of rim surface 13, 16.

In order to fabricate the invention, the inner ring is fixed by a clamping means. The inertial ring is held in the proper final position relative to the inner ring. The elastomeric member is then pressed between the rings by a ram. The flexible nature of the elastomeric allows it to follow the contours between the surfaces 13, 16 as it is pressed in place. During assembly the rubber goes through a high degree of compression, as it passes through the waists and/or. surface contours. Once assembly is complete it is locked in place by the rings. Further, the elastomeric is under compression at all times once assembly is complete. It. is compressed by an amount in the range of 20% to 40%. The uncompressed thickness S of the elastomeric member is compressed by the fabrication process to its final position in the assembled damper in the range of 60% to 80% of S between surfaces 13, 16. Put another way, the gap spacing G is in the range of 60% to 80% of the value of S for the embodiment in FIG. 2. By varying the amount of compression realized by each part of the elastomeric in the assembled damper, the vibration characteristics can be effectively tuned.

Figure 5:
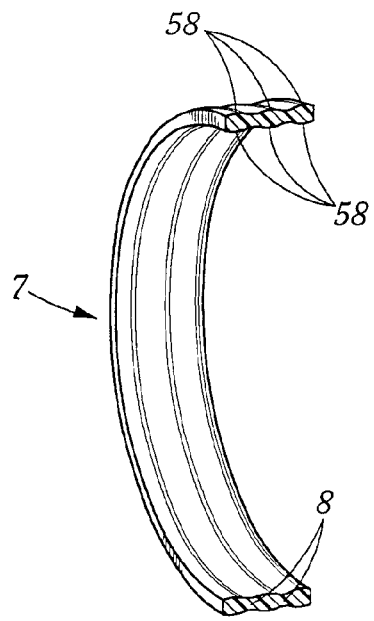
FIG. 5 is a cross-sectional view of an elastomeric member.

FIG. 5 is a cross-sectional view of an elastomeric member. Waists 8 are shown in elastomeric member 7. Undulations or bubbles 58 and waists 8 extend in an axial direction about a circumference of the elastomeric member.

Figure 6:
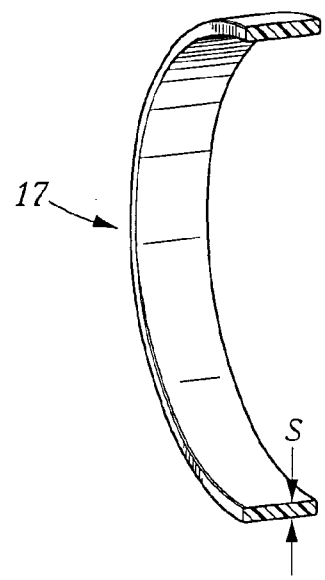
FIG. 6 is a cross-sectional view of an elastomeric member.

FIG. 6 is a cross-sectional view of an elastomeric member. Elastomeric member 17 having unassembled, uncompressed thickness S.

Figure 7:
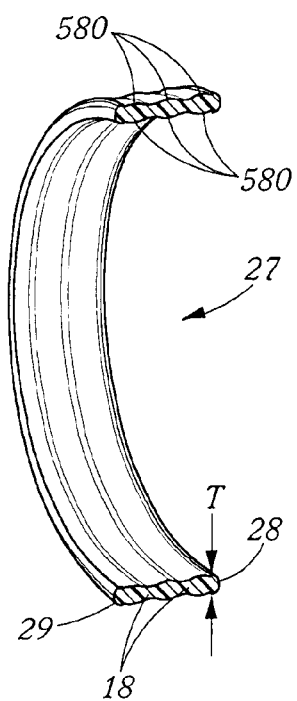
FIG. 7 is a cross-sectional view of an alternate elastomeric member.

FIG. 7 is a cross-sectional view of an alternate elastomeric member. Waists 18 are shown in elastomeric member 27. Undulations 580 and waists 18 extend in an axial direction about a circumference of the elastomeric member 27. Lips 28, 29 extend about an edge outer circumference on each side of the elastomeric member. Lips 28, 29 have a width T that exceeds the gap size G so that the elastomeric member is mechanically locked between the rings.

Figure 8:
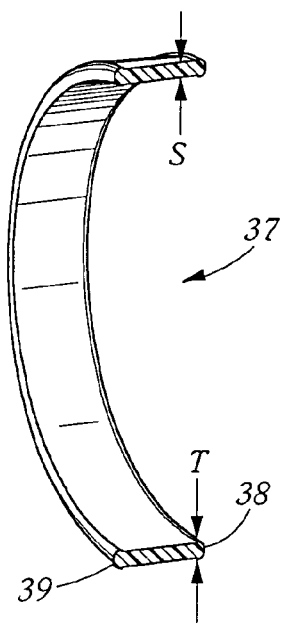
FIG. 8 is a cross-sectional view of an alternate elastomeric member.

FIG. 8 is a cross-sectional view of an alternate elastomeric member. Elastomeric member 37 having thickness S. Lips 38, 39 extend about an edge circumference on each side of the elastomeric member. Lips 38, 39 have a width T that exceeds the gap size G so that the elastomeric member is mechanically locked between the rings.

Figure 9:
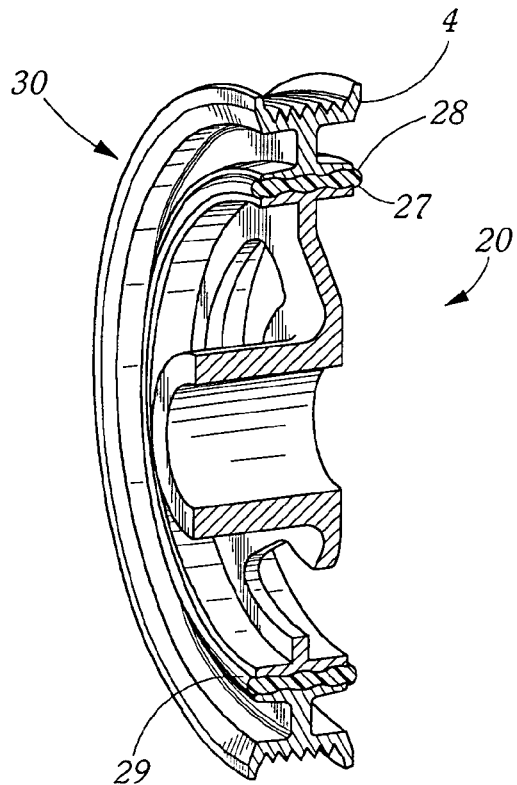
FIG. 9 is a cross-sectional view of an alternate embodiment of the invention.

FIG. 9 is a cross-sectional view of an alternate embodiment of the invention. Elastomeric member 27 is engaged between inner ring 20 and outer ring 30. Lips 28, 29 mechanically lock elastomeric member 27 in place between the rings.

Figure 10:
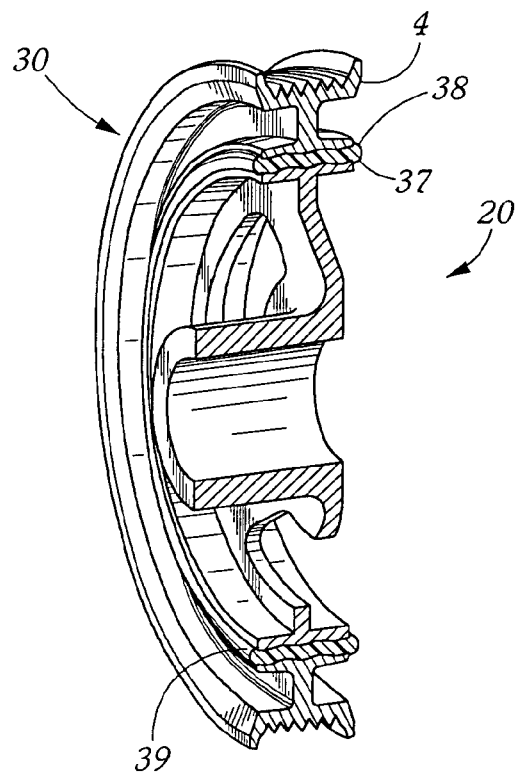
FIG. 10 is a cross-sectional view of an alternate embodiment of the invention.

FIG. 10 is a cross-sectional view of an alternate embodiment of the invention. Elastomeric member 37 is engaged between inner ring 20 and outer ring 30. Lips 38, 39 mechanically lock elastomeric member 37 in place between the rings.

Although a single form of the invention has been described herein, it will be obvious to those skilled in the art that variations may be made in the construction and relation of parts without departing from the spirit and scope of the invention described herein.

I claim:

1. A dual ring damper comprising:

a web extending radially from a hub;

the web having a web rim about a circumference;

an outer ring having an outer ring rim about an inner circumference describing an annular space between the web rim and the outer ring rim; and an elastomeric member engaged in the annular space; the elastomeric member has a preformed profile that matches the annular space gap between the outer ring rim surface and the web rim surface;

the web rim further comprises a web rim surface describing a shape;

the outer ring rim further comprises an outer ring rim surface describing a shape;

the web rim surface extends substantially parallel to a rotational axis of the web;

the outer ring rim surface extends substantially parallel to a rotational axis of the web;

the web rim surface further comprises a plurality of undulations;

the outer ring rim surface further comprises a plurality of undulations;

the web rim surface undulations extend in an axial direction about the circumference of the web rim surface;

the outer ring rim surface undulations extend in an axial direction about the circumference of the outer ring rim surface; and the web rim surface undulations and the outer ring rim surface undulations are arranged such that the annular space is constant between the web rim surface and the outer ring rim surface.

2. The damper as in claim 1, wherein the elastomeric member has a constant thickness.

3. The damper as in claim 1, wherein an elastomeric member thickness is compressed between the web rim surface and the outer ring rim surface in an amount less than 40%.

4. The damper as in claim 3, wherein the elastomeric member further comprises:

A pair of lips, each lip extending about an edge circumference, and each lip having a thickness exceeding and annular space width.

5. The damper as in claim 3, wherein:

the web rim surface comprises a frictional texture; and the outer ring rim surface comprises a frictional texture.

6. The damper as in claim 5, wherein:

the web rim surface texture and the outer ring rim. surface texture mechanically fix the elastomeric member in the annular space.

\* \* \* \* \*